Figure 1:
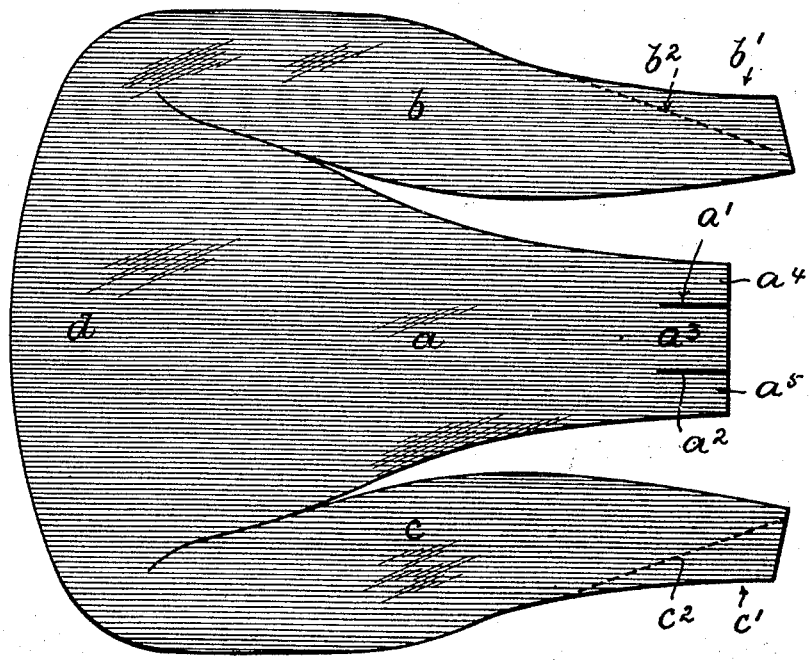

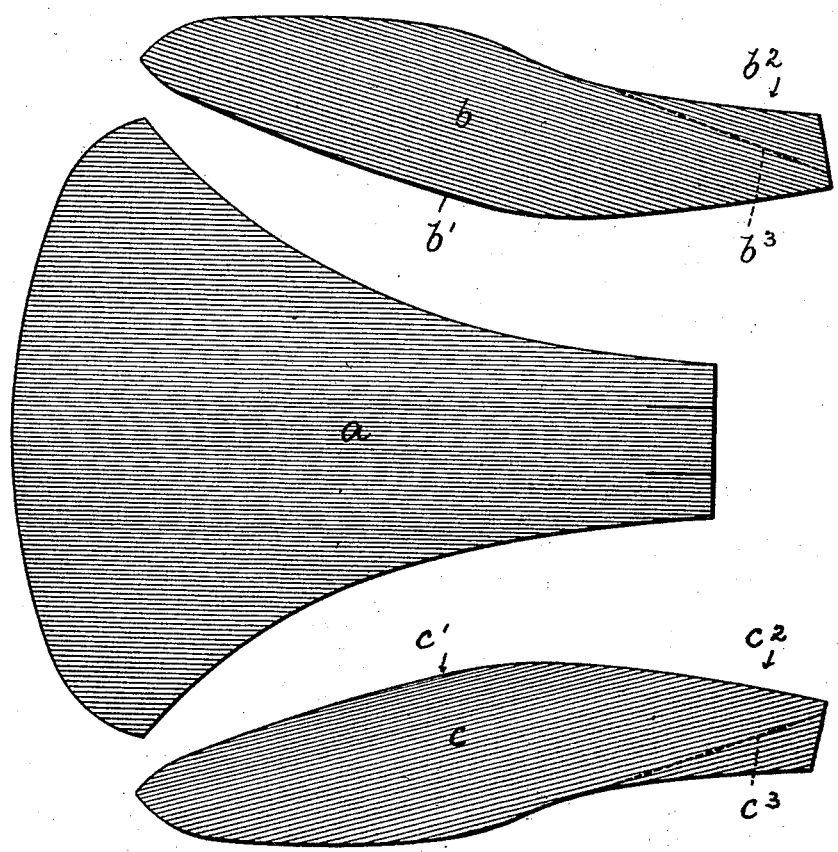

Patented Mar. 8, 1927.

1,620,554

UNITED STATES PATENT OFFICE.

HENRY JELLEY, OF BIRMINGHAM, AND JAMES JELLEY, OF COVENTRY, ENGLAND.

MANUFACTURE OF CYCLE AND LIKE SADDLES.

Application filed September 27, 1923, Serial No. 665,127, and in Great Britain November 2, 1922.

Our invention has reference to cycle and like saddle-tops of the kind in which a carcass or interlayer of canvas or other stretch-resisting fabric is included, shaped and vulcanized between layers of india-rubber or other vulcanizable compound, and comprises improved methods of manufacture which enable the component materials to be shaped and assembled (in full view of the operator) wholly or mainly by hand to practically the finished shape required, and ensure that when the hand-formed product is subjected to final or finishing pressure and vulcanizing treatment between dies or moulds, the canvas will conform to such treatment without pleating or puckering-up and without undergoing undesirable stretching or distortion.

The improved methods also provide for the disposition of the carcass material to the best advantage for reinforcing and preserving the shape of all parts of the saddle top (i. e. the flaps or skirts as well as the middle area) without, however, impairing the softness and flexibility of such flaps.

According to our said invention, we shape and build up or assemble the component materials of a composite saddle-top upon an assembling former or block that preferably has the exact contour of the underside of the finished article, and which may indeed be a male die or mould as used in the finishing and vulcanizing operation, and we produce the carcass, and preferably also the two vulcanizable layers, from appropriate sheet material cut to such a shape that each component may be readily manipulated to the desired saddle-top conformation on being applied or assembled, in its proper sequence, to or upon the former.

In the accompanying drawings,

Fig. 1 is a plan view of a form of carcass showing one manner in which we may arrange or dispose the various parts thereof during the application or assembly of the same to a layer of vulcanizable compound upon the assembly former, and, Fig. 2 is a plan view of a form of carcass made up of three separate pieces or sections of material.

The carcass shown in Figure 1 of the drawings is produced from a single piece or blank of canvas (shaped substantially as shown in the said figure) which is cut out "on the straight", or with the weft threads of the fabric running parallel to the longest dimensions of the blank, and it comprises a middle portion $a$ and two wings or side portions $b$, $c$ all merging into a rear or cantle portion $d$. The middle portion $a$ corresponds to and serves to reinforce or strengthen the central part of the saddle-top, whereas the wings $b$, $c$, correspond to and serve as flexible reinforcements for the sides or flaps of the said top, and it will be observed from the figure that in the flat blank as cut out from canvas, the material in the middle and in the wings is disposed "on the straight" or with all the weft threads in parallel relationship.

When assembling and shaping this blank onto an under layer of vulcanizable compound already applied and moulded by hand to the assembling former, we arrange so that in the cantle area $d$ and also throughout the length of the main part of the middle section $a$, the natural disposition of the weft and warp threads of the straight-cut material is undisturbed. That is to say, we keep the weft threads as far as possible parallel to the longitudinal centre line of the assembly-former so that the cantle and middle areas of the saddle top wherein the portions $a$, $d$, of the carcass are respectively incorporated may be adapted most effectively to resist longitudinal and transverse stretching strains by this particular thread disposition of the said portions $a$, $d$.

The wing portions $b$, $c$, are, during the shaping of them to the sides of the compound-covered former, disposed at inwardly, converging angles to the centre-line of the area $a$, for the purpose of bringing their weft-threads obliquely to the straight threads of the said area $a$. In other words, the shaping of the wings places the material thereof "on the bias" in relation to the straight-cut middle area, which disposition enables the said wings to flex or give appreciably under longitudinal and lateral pull. Further, when, after the assembly of the materials is completed and the hand-built top is subjected to finishing treatment between moulds or dies, the wing portions will easily shape down to the required finished contour without becoming puckered, strained, or distorted, and although the wing portions provide for the reinforcement of the whole of the skirt or flaps of the top, they render, by virtue of the tread disposition referred to, the said flaps sufficiently elastic or flexible to avoid undue hardness and ensure comfort to the rider when the saddle is in use.

In thus shaping the carcass blank (which is preferably made of rubber-coated canvas) it is advantageous to cause the inner edges of the wings and the outer edges of the middle portion $a$ to overlap to a suitable extent and make the overlapping surfaces adhere.

To provide for the strengthening of the nose or peak end of the saddle-top, the front end of the portion $a$ may be slit longitudinally at $a^1$, $a^2$, for a suitable distance and in the shaping operations, the part $a^3$ between the slits is turned downwards over the peak-end of the compound layer on the former whilst the parts $a^4$, $a^5$, outwards of the slits are wrapped round and made to adhere to the turned-down piece $a^3$. Further the wings in the blank may be cut to such a length as to enable the front ends $b^1$, $c^1$, thereof also to be utilized as stretch-resisting peak reinforcements supplementary to the reinforcement afforded by the end pieces $a^3$, $a^4$ $a^5$, of the centre portion. In such a case, the wings are made longer than the middle of the blank as shown in Figure 1, and to obtain the most advantageous stretch-resisting effect, we fold or double the ends $b^1$, $c^1$, on appropriate diagonal lines (such as indicated by dotted lines $b^2$, $c^2$ in the said figure) so as to dispose the weft threads of the folded-over portions in such a way that, on the same being turned or wrapped round and shaped to the peak, they, (the weft threads of the folded portions) run "on the straight", in relation to the bias-disposed material of the flap-reinforcements. By thus utilizing the front ends of the middle and wing portions of the blank as peak reinforcements, the material is not only made use of to the best advantage for resisting stretch, but we embody in the peak a number of overlapping thicknesses of material which gives this part of the saddle-top substantial strength and a capacity for resisting stretch and deformation in all directions.

Both the under layer and top layer of vulcanized compound between which the carcass is included may advantageously be made from blanks of sheet compound comprising middle, wing and cantle portions of approximately the same shape as the carcass-blank. This enables the material to be applied and moulded to shape by hand, or by hand pressure supplemented by finishing treatment with rolls or similar hand tools, and as the operations of shaping the covering layers are conducted in full view of the operative, any irregularities in thickness or the like can be easily detected and rectified, both during the application of the first or under-layer of the top to the former and during the application of the upper layer upon the shaped canvas carcass. Similarly the shaping of the carcass in full view of the operator, and prior to it being covered with compound, greatly facilitates the application of the canvas to the under-layer evenly and without puckering or creasing.

The built-up and hand-shaped top made on an assembling former as described only needs final pressure and vulcanizing treatment between a pair of dies or moulds to produce the finished article.

Instead of forming the carcass from the single blank of canvas or the like as above described, we make up the same of three separate pieces or sections of material as shown in Figure 2 viz a middle piece $a$, and two side-pieces $b$, $c$; the latter being used to flexibly reinforce the flaps of the saddle and to strengthen the nose or peak thereof, and in making or building up the saddle top, on a former as already described, we assemble these three pieces into a complete carcass in which the fabric in the middle area is "on the straight" and the fabric in the flaps lies "on the bias" to the length of the saddle top, whereas if (as may be done) the forward ends of the side-pieces are used as peak-reinforcements, these are also arranged on the straight as hereinafter described.

The canvas middle piece $a$ has a shape substantially as shown and is cut out on the straight (i. e. with its weft threads running parallel to its longitudinal centre-line, whereas the side pieces $b$, $c$, are cut out on the bias of the fabric so that the portions finally incorporated in the flaps of the top will, whilst substantially reinforcing the said flaps, nevertheless give them such a degree of flexibility as to render the saddle comfortable to ride, whilst to ensure that the said side-pieces will naturally or easily take the shape of the saddle skirts during the building-up and moulding operations, their inner edges $b'$, $c'$ of the flap-forming portions may be cut on the concave to a suitable radius.

In making up the carcass by hand from the three pieces above referred to, we make use of a saddle-shaped mould or former block which is similar in contour to the male moulding die, and, after applying thereto the underlayer of vulcanizable compound, we lay the said pieces over the said layer and shape them by hand during assembly. That is to say, after the middle piece has been laid along the middle of the covered former, and the front end thereof shaped by hand into the peak of the carcass, the bias-cut side pieces are laid upon and shaped to the opposite sides of the said former and the inner edges of the cantle and flap portions are respectively secured or made to adhere to the opposite outer edges of the middle section, during which operation the concaved edge shapings intermediate the cantle and nose ends of the said side pieces permit the flap-forming parts of the latter to fall readily to the contour of the flap and adjacent portions of the former-block. Alternatively, the side pieces may be laid on first and the middle piece applied afterwards.

In this assembly of the bias-cut side-pieces to the straight-cut middle piece, we preserve, or even render more pronounced, the obliquity of the weft threads in the flap portions of the side pieces relatively to the longitudinally-disposed weft threads of the middle piece, so that in the completed carcass, we have a middle area that naturally resists longitudinal and transverse stretch combined with properly-shaped flaps which are capable of stretching or flexing sufficiently to enable the same readily to conform, without distortion, to the final shaping action of the moulding dies and to give the desired flexibility to the flaps of the finished saddle-top.

As regards the forward end portions $b^2$, $c^2$ of the bias-cut side-pieces, these may be used to reinforce the peak end of the top in which case, we propose to fold or double-under the said forward ends on appropriate diagonal lines as indicated by the dotted lines $b^3$, $c^3$, so as to transpose the threads thereof from the bias into the straight relatively to the flap-forming portions. This not only disposes the threads of the peak-reinforcements most effectively for enabling them to resist stretch, but also gives us double thicknesses of material which, on being wrapped round and secured to the sides and front of the parts of the middle piece that are also wrapped round the peak, produces a complete peak of substantial strength and having the capacity of resisting stretch or deformation in all directions.

After the application and shaping of the three-piece carcass over the under layer of compound on the former, the top compound layer is applied and shaped over the carcass as already described in connection with the method of carrying out the invention with a one-piece carcass (Figure 1) and in order to facilitate the shaping of these layers by hand, we may make up both of them from three pieces of sheet compound cut to the same shape or approximately the same shape as the component pieces of the carcass Figure 2, or alternatively we may make the layers from one-piece blanks of sheet material approximating in shape to Figure 1.

Having described our invention, what we claim and desire to secure by Letters Patent is:—

1. Method of producing and shaping a carcass or canvas interlayer for saddle tops of the kind referred to, involving the use of a blank which, when in the flat, the weft threads in the cantle, middle and wing portions are parallel or substantially parallel, whereas during the shaping of the carcass, the weft threads of the wing portions for reinforcing the flaps or shirts of the top are disposed at converging angles to the weft threads of the middle portion, for the purpose herein set forth.

2. Method of strengthening the peak or nose end of a saddle top of the kind referred to, involving the use of a carcass blank as claimed in claim 1, wherein the front ends of the wings are folded obliquely and overlapped round the front of the peak of the vulcanizable under layer substantially in the manner herein described.

3. A saddle top of the kind referred to comprising a carcass or fabric interlayer reinforcing all parts of the top and comprising a middle portion wherein the weft threads are disposed parallel or substantially parallel to the longer centre line of the top, and side or flap-reinforcing portions whose weft-threads are disposed obliquely to the centre-piece weft-threads, for the purposes herein set forth.

In testimony whereof we hereunto affix our signatures.

HENRY JELLEY.
JAMES JELLEY.